United States Patent
Abe

(10) Patent No.: US 9,109,868 B2
(45) Date of Patent: Aug. 18, 2015

(54) METHOD AND PROGRAM FOR USING GESTURES TO CONTROL A COORDINATE MEASURING DEVICE

(71) Applicant: MITUTOYO CORPORATION, Kanagawa (JP)

(72) Inventor: Shinsaku Abe, Hokkaido (JP)

(73) Assignee: MITUTOYO CORPORATION, Kanagawa (JP)

( * ) Notice: Subject to any disclaimer, the term of this patent is extended or adjusted under 35 U.S.C. 154(b) by 115 days.

(21) Appl. No.: 14/102,698

(22) Filed: Dec. 11, 2013

(65) Prior Publication Data

US 2014/0190027 A1 Jul. 10, 2014

(30) Foreign Application Priority Data

Jan. 8, 2013 (JP) ................. 2013-000892

(51) Int. Cl.
*G01B 5/008* (2006.01)
*G01B 21/04* (2006.01)

(52) U.S. Cl.
CPC ............. *G01B 5/008* (2013.01); *G01B 21/047* (2013.01)

(58) Field of Classification Search
CPC .... G01B 5/008; G01B 21/047; G01B 21/045; G01B 21/042
USPC ........................ 33/503, 504; 702/95, 155, 168
See application file for complete search history.

(56) References Cited

U.S. PATENT DOCUMENTS

| | | | |
|---|---|---|---|
| 2003/0069709 A1* | 4/2003 | Noda et al. ................. | 702/104 |
| 2008/0188983 A1* | 8/2008 | Ban et al. .................... | 700/245 |
| 2008/0204369 A1* | 8/2008 | Brown ......................... | 345/55 |
| 2010/0250178 A1* | 9/2010 | Noda et al. ................. | 702/95 |
| 2011/0288818 A1* | 11/2011 | Thierman et al. .......... | 702/159 |
| 2013/0054188 A1* | 2/2013 | Chang et al. ............... | 702/155 |
| 2013/0110461 A1* | 5/2013 | Chang et al. ............... | 702/167 |
| 2014/0059872 A1* | 3/2014 | Nakagawa et al. ......... | 33/502 |
| 2015/0041094 A1* | 2/2015 | Yoshimura .................. | 164/4.1 |
| 2015/0153149 A1* | 6/2015 | Pettersson et al. .......... | 33/503 |

FOREIGN PATENT DOCUMENTS

JP 2007-047014 2/2007

OTHER PUBLICATIONS

U.S. Appl. No. 14/147,834 to Shinsaku Abe, filed Jan. 6, 2014.

* cited by examiner

*Primary Examiner* — G. Bradley Bennett
(74) *Attorney, Agent, or Firm* — Greenblum & Bernstein, P.L.C.

(57) ABSTRACT

A coordinate measuring device includes a measuring probe measuring three-dimensional coordinates; a measuring arm supporting the measuring probe and outputting position information for calculating the three-dimensional coordinates; a controller connected to the measuring arm and detecting the three-dimensional coordinates based on the position information; and a display displaying a menu. The controller further displays the menu on the display when a predefined menu display operation performed using the measuring probe is detected.

16 Claims, 11 Drawing Sheets

RELATED ART

RELATED ART

METHOD AND PROGRAM FOR USING GESTURES TO CONTROL A COORDINATE MEASURING DEVICE

CROSS-REFERENCE TO RELATED APPLICATIONS

The present application claims priority under 35 U.S.C. §119 of Japanese Application No. 2013-000892, filed on Jan. 8, 2013, the disclosure of which is expressly incorporated by reference herein in its entirety.

BACKGROUND OF THE INVENTION

1. Field of the Invention

The present disclosure relates to a coordinate measuring device, and to a method and program for using gestures to control the coordinate measuring device. In particular, the present disclosure relates to a coordinate measuring device having an articulated arm, and to a method and program for using gestures to control the coordinate measuring device having the articulated arm.

2. Description of Related Art

A coordinate measuring device is known which uses an articulated arm and a measuring probe that allow direct manual movement by a measuring operator to obtain a three-dimensional coordinate value for a desired point on a work piece and perform measurement of a three-dimensional shape, a surface texture, and the like of the work piece.

For example, Japanese Patent Laid-open Publication No. 2007-047014 discloses a coordinate measuring device that includes an articulated arm with a measuring probe retained in a forefront end thereof. The coordinate measuring device has an angle sensor installed at each joint and computes spatial coordinates of a forefront end of the probe based on a rotation angle of each joint detected by the angle sensors and a length between arm joint and arm joint, between arm joint and probe, and the like. An operator places a hand directly on the articulated arm and brings the probe retained in the forefront end of the articulated arm into contact with a surface of a work piece, then measures the work piece.

The coordinate measuring device of this kind is generally connected to a control device such as a PC (Personal Computer) located at a distance from the device. Control software, which runs on the PC, is capable of outputting a plurality of menus to a display device, and can receive an operation by the operator selecting one of the menus, then can execute various functions such as measurement, saving measured data, making various settings, and the like according to the menu selected.

This kind of menu selection operation is required even when the operator is in the midst of executing a measurement. In such a case, the measuring operator must move from a vicinity of the coordinate measuring device to a vicinity of the PC.

In order to address this circumstance, a method (hereafter, an arm menu) can be provided in which, for example, a menu is displayed large enough to be visible to an operator even from a vicinity of a coordinate measuring device, and in which one among a plurality of menus is displayed highlighted in response to an up-down movement of the arm and the like, and the highlighted menu can be selected in response to operation of a button provided in the vicinity of a probe and the like (see FIG. 13). Thereby, the operator can execute the menu selection operation without moving away from the coordinate measuring device.

However, the following circumstances are present in the above-noted arm menu. First, the menu selection operation cannot be executed during execution of the measurement. This is because the control device cannot distinguish whether a gesture of the arm is an operation for measurement or an operation for menu selection. Thus, in order to perform the menu selection operation, the operator must interrupt execution of the measurement.

In addition, in the above-noted arm menu, when the operator wishes to repeatedly select the same menu in order to repeatedly execute the same function, the same series of menu selection operations must be repeatedly performed. Therefore, time and effort for the menu selection operation increases.

Further, in the above-noted arm menu, the menu is always displayed on a screen at a large size, and thus an area for display of data such as measurement results may be constricted, for example.

In addition, in the above-noted arm menu, in order to select a menu, the arm must be moved up and down. Therefore, selection takes time, or there is a significant physical burden on the operator and, moreover, when moving the arm, there is a possibility that the arm may strike a measurement environment (a person or work piece nearby) or the like and negatively affect safety.

In addition, in the above-noted arm menu, in order to select a menu with the control device, the arm must frequently be returned to a home position. Thus, a risk of damage increases and reliability decreases.

SUMMARY OF THE INVENTION

The present disclosure has been devised in order to address the circumstances above, and the present disclosure provides a coordinate measuring device, and a method and program for controlling the coordinate measuring device, that improve operability and safety of menu selection.

A coordinate measuring device according to the present disclosure includes a measuring probe measuring three-dimensional coordinates; a measuring arm supporting the measuring probe and outputting position information for calculating the three-dimensional coordinates; a controller connected to the measuring arm and detecting the three-dimensional coordinates based on the position information; and a display displaying a menu. The controller further displays the menu on the display when a predefined menu display operation performed using the measuring probe is detected.

A method of controlling the coordinate measuring device according to the present disclosure includes detecting a predefined menu display operation performed using a measuring probe; and displaying a menu on a display in response to detection of the menu display operation.

A program according to the present disclosure is a program for executing the above method on a computer.

According to the present disclosure, a coordinate measuring device, and a method and program for controlling the coordinate measuring device, can be provided that improve operability and safety of menu selection.

BRIEF DESCRIPTION OF THE DRAWINGS

The present disclosure is further described in the detailed description which follows, in reference to the noted plurality of drawings by way of non-limiting examples of exemplary embodiments of the present disclosure, in which like reference numerals represent similar parts throughout the several views of the drawings, and wherein.

DETAILED DESCRIPTION OF THE INVENTION

The particulars shown herein are by way of example and for purposes of illustrative discussion of the embodiments of the present disclosure only and are presented in the cause of providing what is believed to be the most useful and readily understood description of the principles and conceptual aspects of the present disclosure. In this regard, no attempt is made to show structural details of the present disclosure in more detail than is necessary for the fundamental understanding of the present disclosure, the description taken with the drawings making apparent to those skilled in the art how the forms of the present invention may be embodied in practice.

In order to facilitate understanding of the present invention, a typical configuration of a coordinate measuring device is described before describing embodiments of the present invention.

Figure 14:
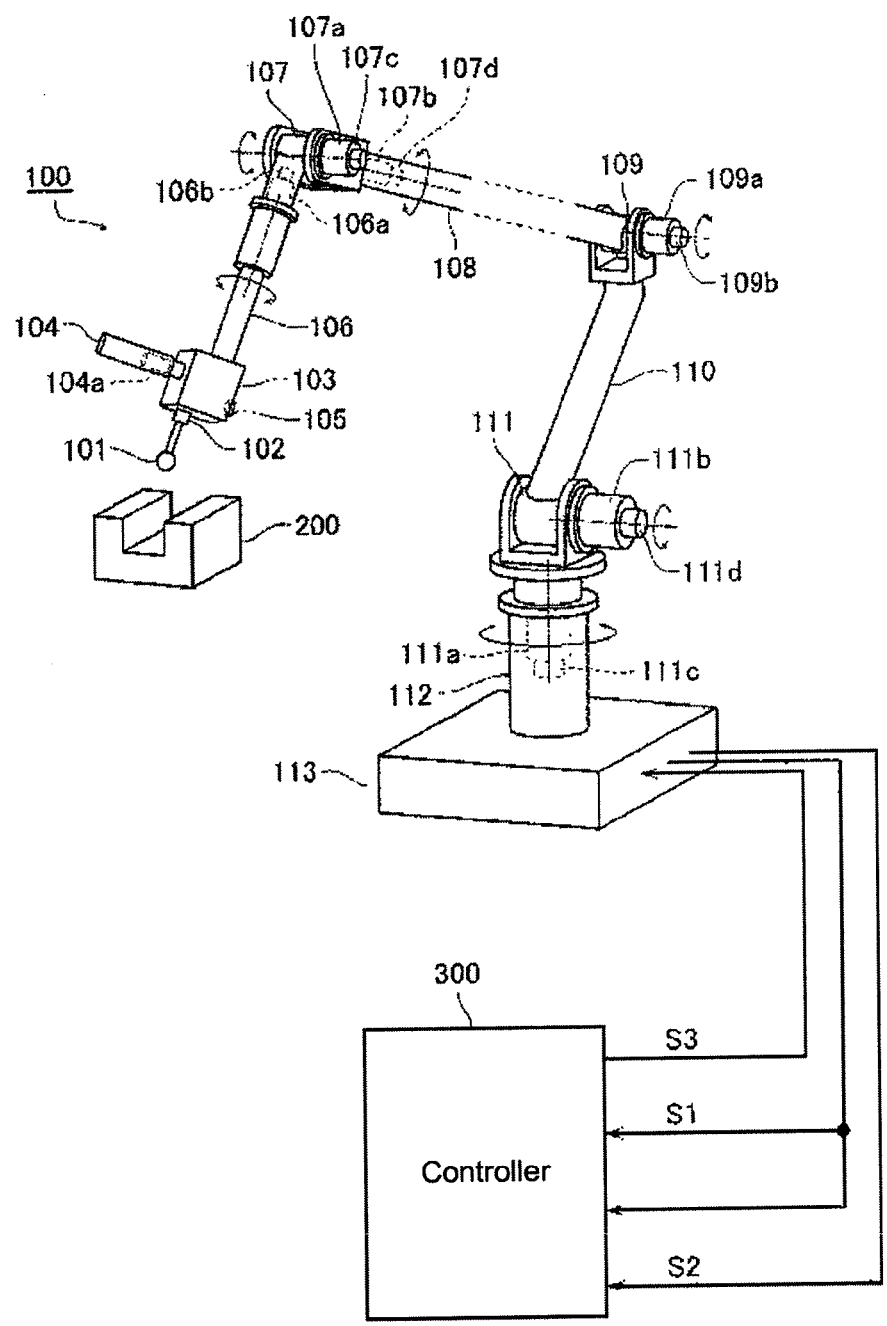
FIG. 14 illustrates a conventional configuration of a coordinate measuring device.

FIG. 14 illustrates a configuration of a coordinate measuring device. The coordinate measuring device includes a measuring probe 101 configured from a contact-type ball probe measuring a work piece 200; a measuring arm 100 supporting the measuring probe 101; and a controller 300 controlling the measuring arm 100 to be in a specific position and orientation.

The measuring arm 100 includes first through third links 106, 108, and 110; a support pillar 112; and first through third joints 107, 109, and 111 connecting these components. The support pillar 112 stands perpendicularly on a base 113 fixated to a work bench and the like. The support pillar 112 is connected to a first end of the third link 110 via the third joint 111. The third joint 111 includes an actuator 111a generating rotational torque with respect to the support pillar 112 within a horizontal plane of the third link 110; an angle sensor 111c detecting a rotation angle of the actuator 111a; an actuator 111b generating rotational torque with respect to the support pillar 112 within a perpendicular plane of the third link 110; and an angle sensor 111d detecting the rotation angle of the actuator 111b. A second end of the third link 110 is connected to a first end of the second link 108 via the second joint 109. The second joint 109 includes an actuator 109a generating rotational torque of the second link 108 with respect to the third link 110 within a plane parallel to a center axis of the third link 110, and an angle sensor 109b detecting the rotation angle of the actuator 109a. Moreover, a second end of the second link 108 is connected to the first link 106 via the first joint 107. The first joint 107 includes an actuator 107b generating rotational torque of the first link 106 with respect to the second link 108, around a center axis of the second link 108; an angle sensor 107d detecting the rotation angle of the actuator 107b; an actuator 107a generating rotational torque of the first link 106 with respect to the second link 108, within a plane parallel to the center axis of the second link 108; and an angle sensor 107c detecting the rotation angle of the actuator 107a. In addition, an actuator 106a generating rotational torque around a center axis of the first link 106 and an angle sensor 106b detecting the angle of the actuator 106a are provided to a portion of the first link 106 connecting to the first joint 107. The measuring arm 100 is thus configured to be operable with six axes.

A probe head 103 is attached to a second end of the first link 106. The probe head 103 includes a handle 104 and a passive measuring button 105 on a side surface, and includes a probe attacher 102 on a forefront end. The measuring probe 101 is attached to the probe head 103 via the probe attacher 102. By gripping the handle 104 to operate, a measuring operator brings the measuring probe 101 into proximity with the work piece 200 from any desired direction, then makes contact with the work piece 200 at any desired angle to conduct a measurement. In addition, the probe attacher 102 is configured such that various probes can be attached. The measuring probe 101 of FIG. 14 brings a forefront end thereof into contact with a surface of the work piece 200 and obtains coordinates of a contact point. However, the measuring probe 101 can be exchanged for a non-contact-type probe, for example, such as an imaging probe using a CCD camera or image sensor, or a laser scanning-type laser probe. Furthermore, rotation axes are not limited to the six as shown in FIG. 14. Joints with five or fewer axes, or seven or more axes, may be provided instead. Also, the measuring probe 101 may be a copying probe continuously measuring contour shape data of a measured surface.

An angle detection signal S1 is output from the measuring arm 100, the angle detection signal S1 serving as position information indicating a relative angle of each of the joints 107, 109, and 111, which is detected by the angle sensors 106b, 107d, and so on. A controller 300 inputs the detection signal S1, then calculates the coordinates of the contact point between the probe 101 and the work piece 200 using a method described in Japanese Patent Laid-open Publication No. 2007-047014, for example.

Figure 1:
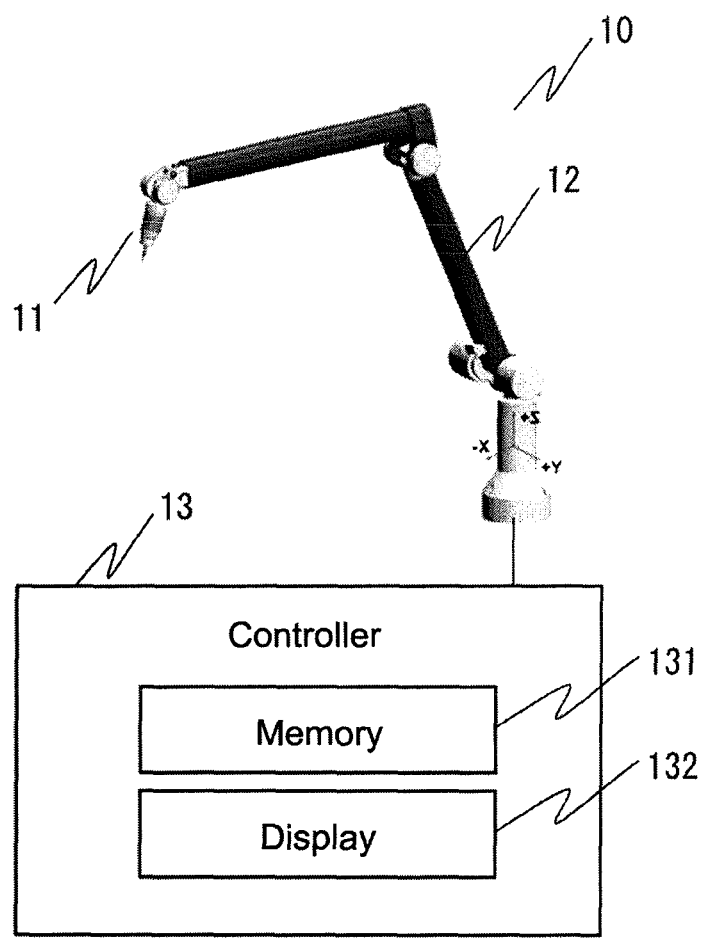
FIG. 1 illustrates a configuration of a coordinate measuring device according to a first embodiment.

Hereafter, based on such a coordinate measuring device, embodiments of the present invention are described with reference to the drawings. FIG. 1 illustrates a configuration of a coordinate measuring device 10 according to the embodiments of the present invention.

The coordinate measuring device 10 includes a measuring probe 11 for measuring a work piece; a measuring arm 12 supporting the measuring probe 11 such that the measuring probe 11 is capable of displacement in response to an external force, the measuring arm 12 also outputting position information for the measuring probe 11; and a controller 13 inputting the position information and calculating three-dimensional coordinates of the measuring probe 11.

The controller 13 includes a memory 131 and a display 132. The memory 131 can store measurement results of three-dimensional coordinates. In addition, the memory 131 stores a menu list for displaying an arm menu (circle menu or circular menu, described below) on the display 132. The display 132 displays and outputs the three-dimensional coordinates (measurement results), as well as the arm menu (circle menu, or circular menu) described below.

The controller 13 may further include an inputter (e.g., a pointing device, a keyboard, etc.) for receiving an instruction or input from an operator.

Next, operations of the coordinate measuring device 10 are described with reference to FIGS. 2-12.

(A. Display of Arm Menu)

First, a method is described for displaying the arm menu on the display 132 without interrupting measurement. In general, the arm menu is not displayed during measurement. In order to display the arm menu during measurement, methods have conventionally been adopted such as direct input control on the controller 13. The present embodiment allows the menu to be displayed with a high level of operability and safety, and without interrupting arm operation. Hereafter, four exemplary methods are given.

(A-1. Display Arm Menu by Detecting Arm Operation Boundary (Limit))

Figure 2:
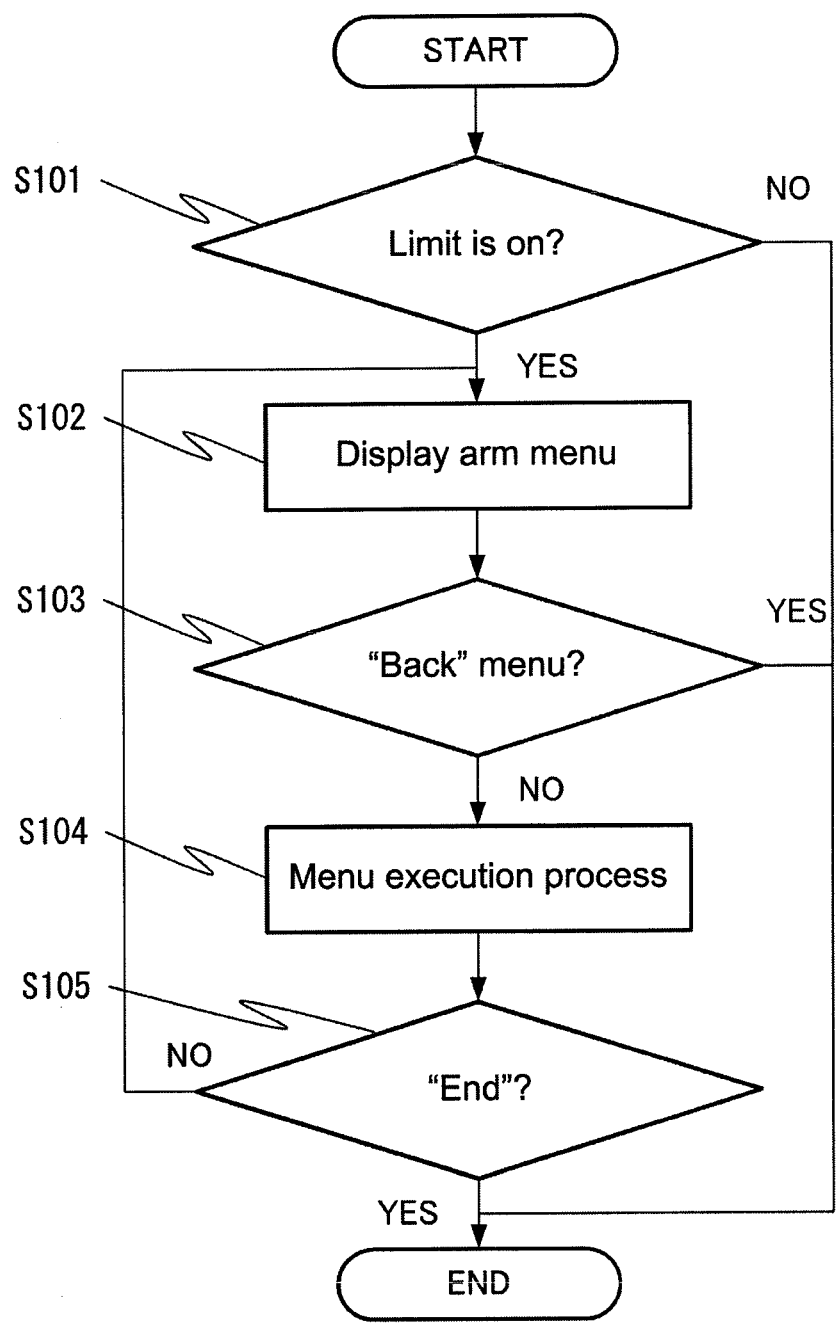
FIG. 2 illustrates a process of the coordinate measuring device according to the first embodiment.

An arm menu display process using detection of the arm operation boundary (limit) is described with reference to the flowchart of FIG. 2.

S101: The controller 13 monitors a limit status of the measuring arm 12 during a process of detecting three-dimensional coordinates of the measuring probe 11. Here, the "limit status" refers to whether the measuring arm 12 has reached the operation boundary (limit). The controller 13 can detect the limit status using a control signal output by the measuring arm 12.

S102: When the controller 13 detects that the limit is ON (i.e., that the measuring arm 12 has reached the limit), the menu list is retrieved from the memory 131 and displayed on the display 132 as the arm menu. Moreover, providing for a case where the operator makes a mistake (i.e., did not intend to display the arm menu) and the measuring arm 12 reaches the limit, the controller 13 preferably, after displaying the arm menu, ceases display of the arm menu after a predetermined amount of time has elapsed. The predetermined amount of time can be made editable by the operator changing a setting ahead of time.

S103: The operator can select one command from a plurality of commands included in the arm menu by displacing the measuring probe 11 retained on the forefront end of the measuring arm 12. Herein, when the controller 13 detects that a "back" command has been selected, for example, the controller 13 enters a probe position reset operation state (in other words, returns to a process detecting the three-dimensional coordinates of the measuring probe 11). Moreover, in addition to the "back" command, when operation of a cancel button and the like provided on the measuring probe 11 is detected, a similar process can be performed.

S104: Meanwhile, when the controller 13 detects that a command for executing a predetermined function has been selected, the controller 13 executes the function corresponding to the command. When execution of the function ends, the controller 13 once again displays the arm menu and executes the process beginning at step S103.

S105: On the other hand, when the controller 13 detects that an "end" command has been selected, for example, the coordinate measuring device 10 is shut down and the process ends.

(A-2. Display Arm Menu by Successive Pressing of Selection Button on Probe)

Figure 3:
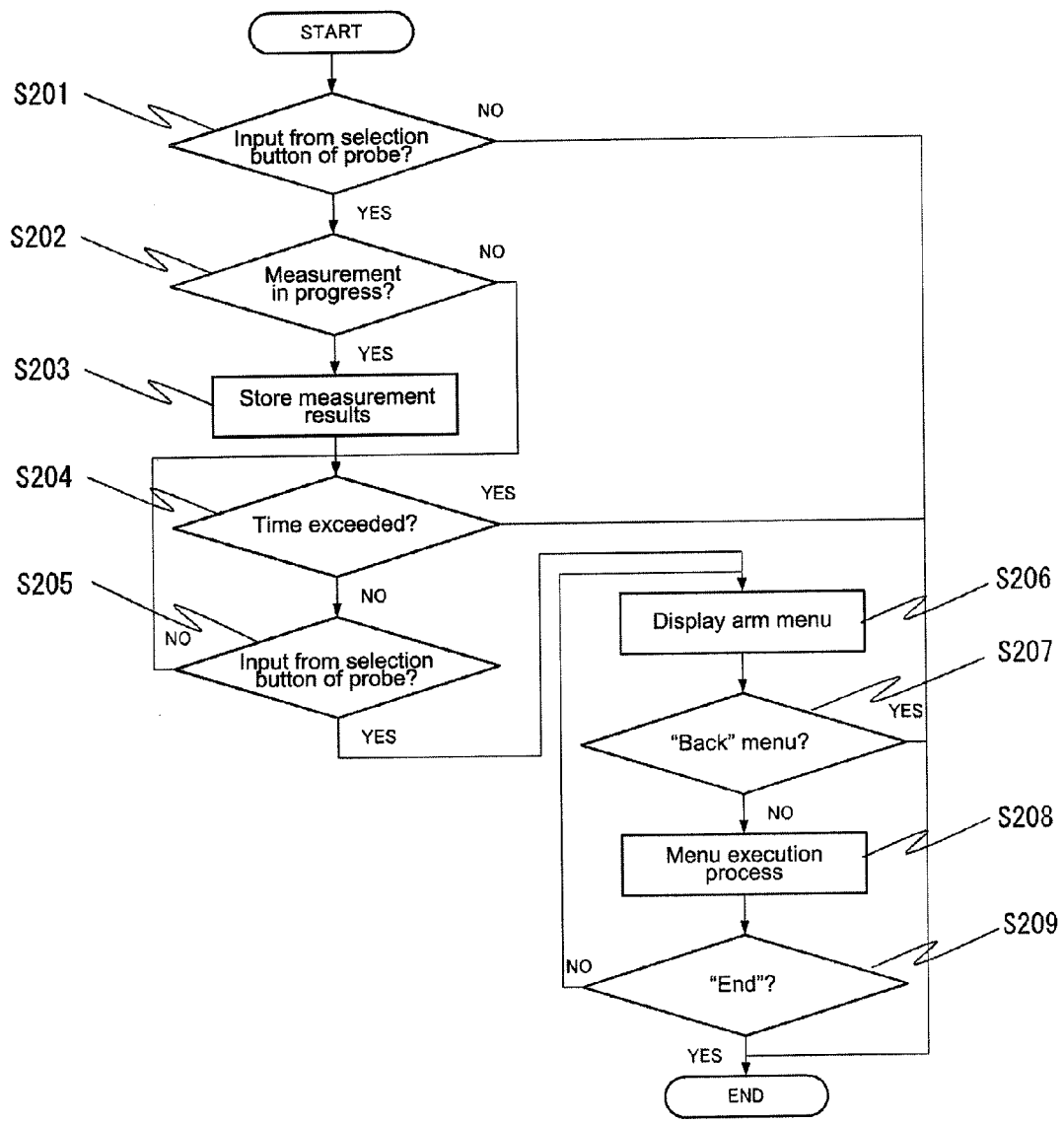
FIG. 3 illustrates a process of the coordinate measuring device according to the first embodiment.

An arm menu display process using successive pressing of a selection button on the probe is described with reference to the flowchart of FIGS. 3.

S201 to S203: When the controller 13 detects depression of a selection button provided to the measuring probe 11 during the process of detecting three-dimensional coordinates of the measuring probe 11, measurement results up to a point of detection are temporarily stored in a volatile memory or the like (not shown in the drawings). Alternatively, the measurement results may be stored in the memory 131.

S204 to S206: When the controller 13 detects another depression of the selection button within a predetermined amount of time after detection of the selection button input in step S201, the menu list is retrieved from the memory 131 and displayed on the display 132 as the arm menu. The predetermined amount of time can be made editable by the operator changing a setting ahead of time.

S207 to S209: Processes involved in subsequent menu selection and command execution can be executed with a method similar to that of steps S103 through S105, described above. Moreover, when selection of the "back" menu or depression of the cancel button is detected in step S207, the controller 13 may display a message on the display 132 prompting the operator to select whether to save or discard the measurement results. Depending on a result of selection by the operator, thereafter the controller 13 can save the measurement results to the memory 131, or can discard the measurement results without saving.

(A-3. Display Arm Menu by Press-and-hold of Selection Button on Probe)

Figure 4:
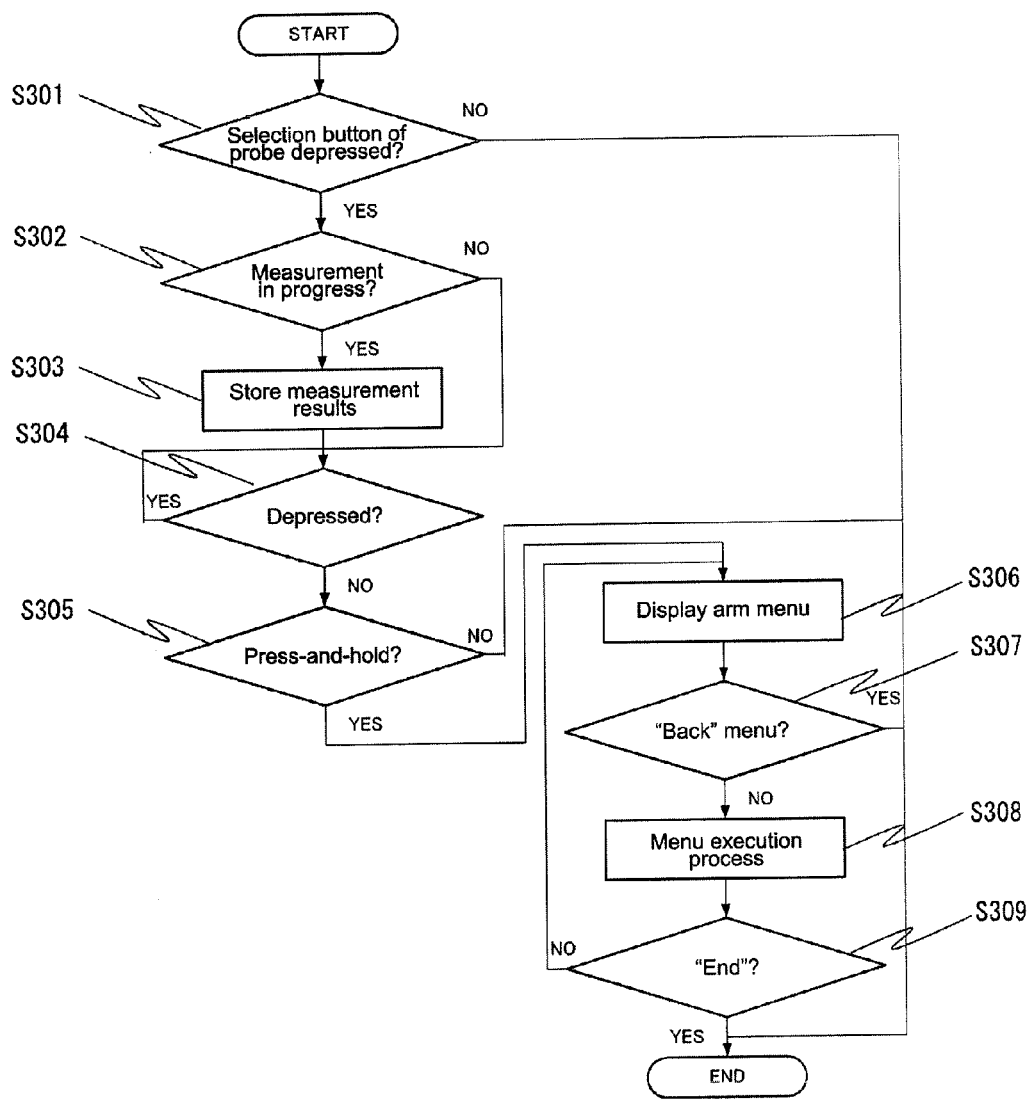
FIG. 4 illustrates a process of the coordinate measuring device according to the first embodiment.

An arm menu display process using press-and-hold of a selection button on the probe is described with reference to the flowchart of FIGS. 4.

S301 to S303: When the controller 13 detects depression of a selection button provided to the measuring probe 11 during the process of detecting three-dimensional coordinates of the measuring probe 11, measurement results up to the point of the detection are temporarily stored in a volatile memory or the like (not shown in the drawings). Alternatively, the measurement results may be stored in the memory 131.

S304 to S306: When the controller 13 detects that the selection button has once again been released or pressed up within a predetermined amount of time after detection of the selection button input in step S301, the menu list is retrieved from the memory 131 and displayed on the display 132 as the arm menu. The predetermined amount of time can be made editable by the operator changing a setting ahead of time.

S307 to S309: Processes involved in subsequent menu selection and command execution can be executed with a method similar to that of steps S207 through S209, described above.

(A-4. Display of Arm Menu by Displacing Probe outside Predefined Measuring Area)

Figure 5:
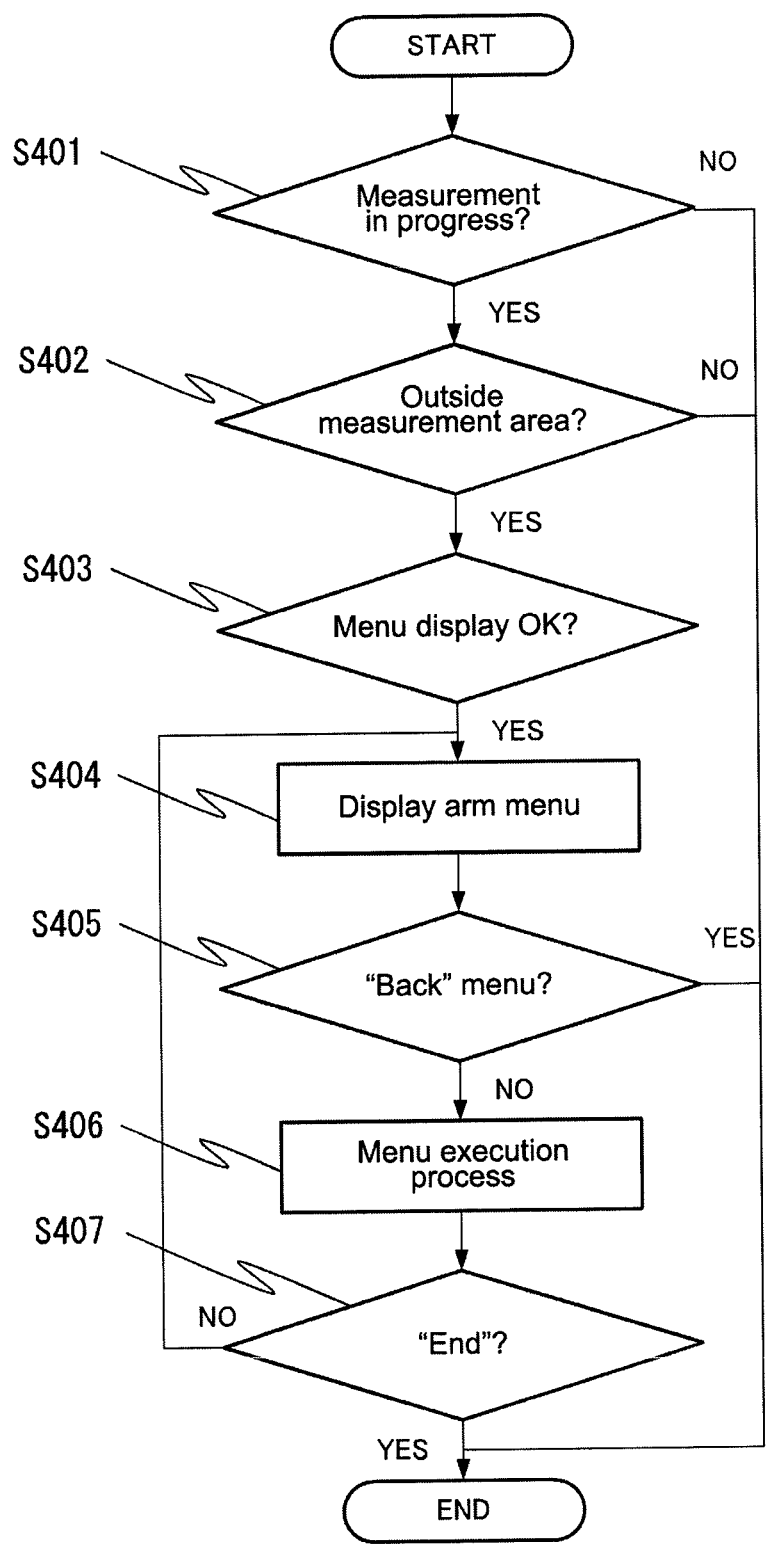
FIG. 5 illustrates a process of the coordinate measuring device according to the first embodiment.

An arm menu display process using displacement of the probe outside a predefined measuring area is described with reference to the flowchart of FIG. 5.

S401: The controller 13 monitors a position (three-dimensional coordinates) of the measuring probe 11 during a process of detecting the three-dimensional coordinates of the measuring probe 11, and determines whether the measuring probe 11 is outside the measuring area defined ahead of time.

Here, the measuring area can be defined by, for example, the controller 13 calculating a space corresponding to an input of an approximate (or rough) shape of the measured object (work piece) with a predetermined safety zone added to the approximate shape. Alternatively, the measuring area may define a desired range within a predetermined three-dimensional space. Moreover, the controller 13 may interrupt the process of step S401 when a predetermined condition set ahead of time is met, such as during a process of obtaining measurement results. The safety zone can be made editable by the operator changing a setting ahead of time.

S402 to S404: When the controller 13 detects that the measuring probe 11 is outside the measuring area, the menu list is retrieved from the memory 131 and displayed on the display 132 as the arm menu. Moreover, the controller 13 may not perform the menu display process of step S404 when a predetermined condition set ahead of time is met, such as during the process of obtaining measurement results.

S405 to S407: Processes involved in subsequent menu selection and command execution can be executed with a method similar to that of steps S103 through S105, described above.

(B. Display of Arm Menu Selectable only by Probe)

Next, a method is described for selecting one of the commands included in the arm menu after the arm menu is displayed on the display 132 by a process of A (noted above), the selection being made simply by moving the measuring probe 11 retained in the forefront end of the measuring arm 12 rather than by moving the entire measuring arm 12. Two exemplary methods are given below.

(B-1. Circle Menu with Donut-shaped Hierarchy)

Command selection and execution processes using a circle menu with a donut-shaped hierarchy are described with reference to FIGS. 6 and 7.

Figure 6:
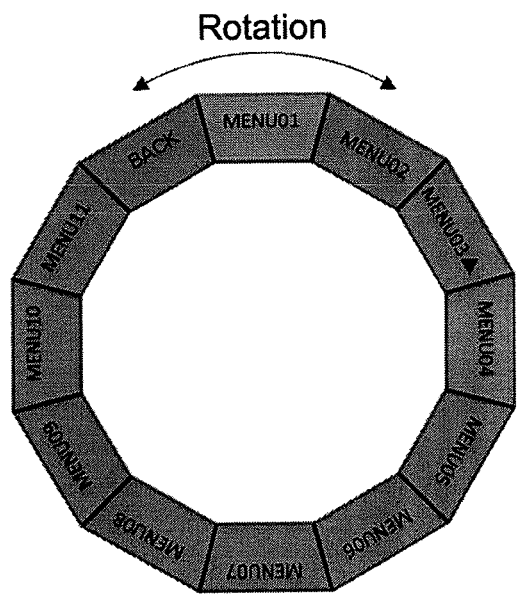
FIG. 6 illustrates an exemplary menu display of the coordinate measuring device according to the first embodiment.
Figure 13:
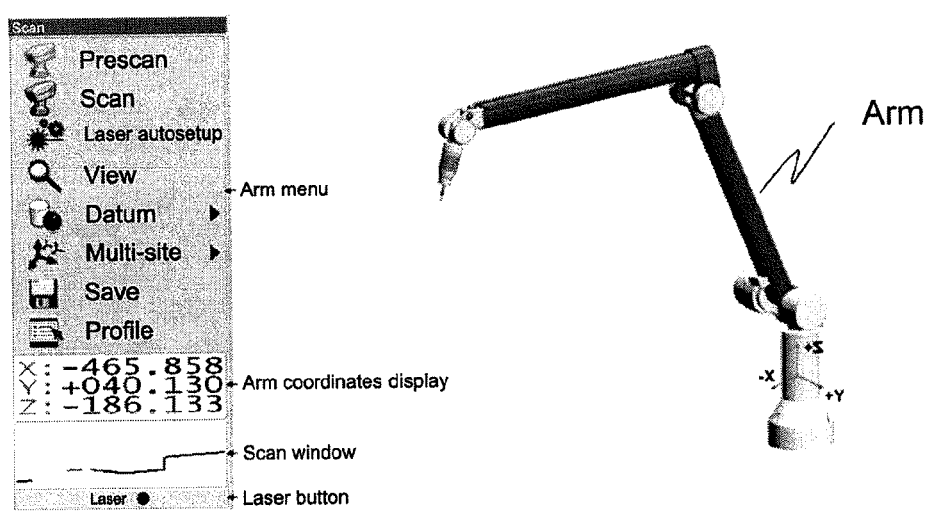
FIG. 13 illustrates a conventional method for menu selection.

FIG. 6 is an example of the circle menu with the donut-shaped hierarchy displayed on the display 132 by the controller 13 instead of a list-shaped arm menu (FIG. 13) having a conventional hierarchy. In the menu, the plurality of commands included in the menu are arrayed in a circle. A current provisionally selected command is displayed highlighted in the circle. In FIG. 6, the command positioned at the apex is displayed highlighted. Herein, the circle menu preferably creates a display enabling all of the commands to be visible at once. This can be achieved, for example, by altering the size of a display area for each command according to a number of commands to be displayed.

The controller 13 rotates the circle menu displayed on the display 132 in response to manipulation of the measuring probe 11 by the operator. In such a case, the highlighted command is always the command positioned at the apex. In other words, the provisionally selected (i.e., highlighted) command changes in order in response to rotation of the circle menu. Moreover, instead of a controller rotating the circle menu, display control may be performed in which the circle menu is fixated and only the highlighted portion changes in order in a circumference direction. In this case also, the provisionally selected (i.e., highlighted) command changes in order.

The controller 13 detects the current provisionally selected (i.e., highlighted) co remand as the command selected by the operator in response to operation of a selection button of the measuring probe 11, or the like, by the operator. The controller 13 executes the selected command.

Figure 7:
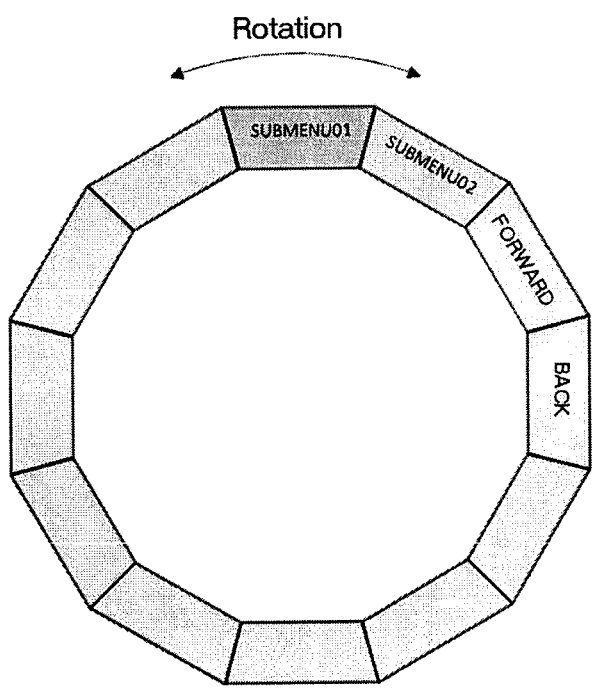
FIG. 7 illustrates an exemplary menu display of the coordinate measuring device according to the first embodiment.

Moreover, when a command having a sub-menu ("MENU 03 ▲" in FIG. 6, for example) is selected, the controller 13 preferably displays a circle menu for the sub-menu on the display 132 (FIG. 7). Command selection and execution processes associated with the circle menu for the sub-menu are similar to those of the circle menu described above.

Moreover, when operation of a cancel button of the measuring probe 11 is detected partway through a process, the controller 13 preferably performs a process such as returning to a process of the immediately previous step or not displaying the circle menu.

(B-2. Drum-shaped Circle Menu Rotating Laterally or Longitudinally)

Command selection and execution processes using a drum-shaped circle menu rotating laterally or longitudinally are described with reference to FIGS. 8 and 9.

Figure 8:
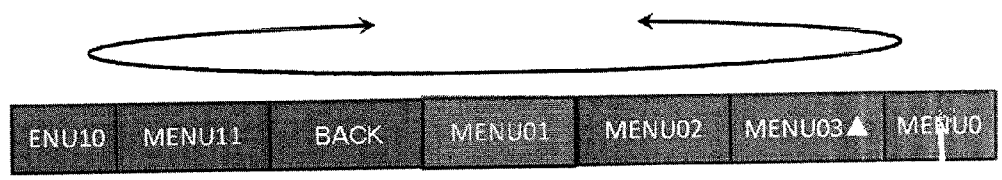
FIG. 8 illustrates an exemplary menu display of the coordinate measuring device according to the first embodiment.
Figure 8:
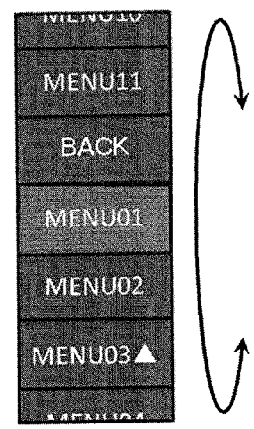

FIG. 8 is an example of the drum-shaped circle menu rotating laterally or longitudinally displayed on the display 132 by the controller 13 instead of a list-shaped arm menu (FIG. 13) having a conventional hierarchy. In the menu, a plurality of commands included in the menu are arrayed in a lateral or longitudinal drum shape. A current provisionally selected command is displayed highlighted on the drum. In FIG. 8, the command positioned at a left-right direction center or at an up-down direction center is displayed highlighted.

The controller 13 rotates the drum-shaped circle menu displayed on the display 132 in response to manipulation of the measuring probe 11 by the operator. In such a case, display of the commands included in the menu is controlled such that the commands displace in order in the left-right or up-down directions, and the commands no longer visible at the left and right ends or the top and bottom ends reappear at the opposite left and right end or top and bottom end.

Further, in such a case, the highlighted command is always the command positioned at the left-right direction center or the up-down direction center. In other words, the provisionally selected (i.e., highlighted) command changes in order in response to rotation of the drum-shaped circle menu.

The controller 13 detects the current provisionally selected (i.e., highlighted) command as the command selected by the operator in response to manipulation of a selection button of the measuring probe 11, or the like, by the operator. The controller 13 executes the selected command.

Figure 9:
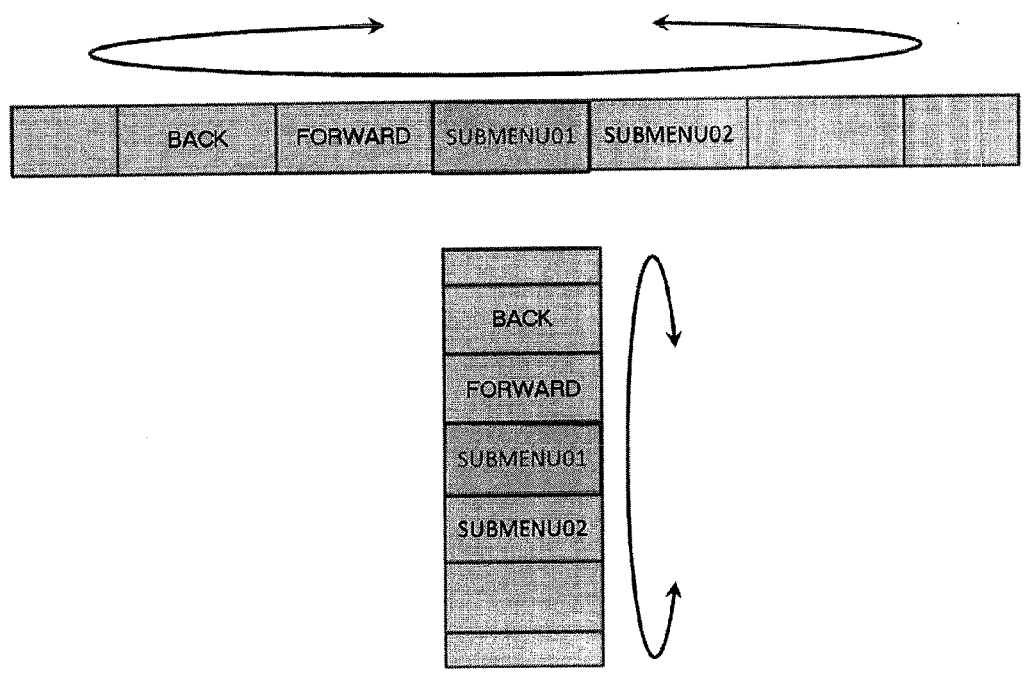
FIG. 9 illustrates an exemplary menu display of the coordinate measuring device according to the first embodiment.

Moreover, when a command having a sub-menu ("MENU 03 ▲" in FIG. 8, for example) is selected, the controller 13 preferably displays a drum-shaped circle menu for the sub-menu on the display 132 (FIG. 9). Command selection and execution processes associated with the drum-shaped circle menu for the sub-menu are similar to those of the drum-shaped circle menu described above. Herein, a sub-menu can be displayed simultaneously above/below or to the left/right of the top (main) drum-shaped circle menu.

Moreover, when operation of a cancel button of the measuring probe 11 is detected partway through a process, the controller 13 preferably performs a process such as returning to a process of the immediately previous step or not displaying the drum-shaped circle menu.

(C. Display of Arm Menu Selectable only by Probe)

Next, a description is given of a specific method of operating the measuring probe 11 when selecting a desired command from the menu in a process of B (noted above). Hereafter, three exemplary methods are given.

(C-1. Operating Circle Menu by Tracing Circle with Probe)

Figure 10:
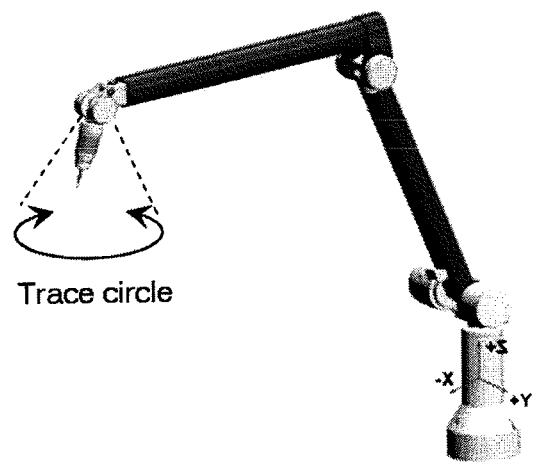
FIG. 10 illustrates an exemplary menu selection operation of the coordinate measuring device according to the first embodiment.

A process of operating the circle menu by tracing a circle with the measuring probe 11 is described with reference to FIG. 10.

While displaying the circle menu, the controller 13 detects a trajectory of the forefront end of the measuring probe 11. For example, by continuously detecting the coordinates of the measuring probe 11 for every fixed amount of time t, the controller 13 obtains a set of time-series coordinates, then, when the measuring probe 11 becomes still (for example, when displacement of the coordinates of the measuring probe 11 stays within a predetermined threshold value for an amount of time T longer than t), the controller 13 stops obtaining coordinates. The controller 13 detects a trajectory based on the obtained set of coordinates. For example, the detected trajectory may be obtained by simply linking the set of coordinates in a time series. Alternatively, the trajectory may be obtained after performing sampling with desired criteria, performing coordinate substitution, and the like on the set of coordinates. Moreover, detecting the trajectory from the set of coordinates may be achieved using other commonly used methods.

The controller 13 identifies whether the detected trajectory of the measuring probe 11 is circular. For example, the controller 13 matches (cross-checks) the detected trajectory and a sample pattern of a circular trajectory pre-stored in the memory 131 and when both match, or have a degree of similarity equal to or greater than a threshold value, the controller 13 can recognize that a circular trajectory has been input. Herein, cross-checking of the trajectory and, typically, determination of a match or degree of similarity can be achieved with various commonly known methods. In addition, herein, the controller 13 preferably identifies a direction in which the circle is traced (rightward or leftward) based on, e.g., a time series order of the set of coordinates included in the trajectory. Further, the controller 13 preferably calculates a speed with which the circle is traced based on, e.g., an amount of time to obtain the set of coordinates included in the trajectory.

When the trajectory of the measuring probe 11 is circular, the controller 13 performs display control, which rotates the circle menu. Herein, a rotation direction of the circle menu preferably changes in response to the direction in which the circle is traced (rightward or leftward). In addition, a rotation speed of the circle menu preferably changes in response to the speed with which the circle is traced. In other words, when the measuring probe 11 is rotated more slowly or more quickly than previously, display of the circle menu is controlled so as to rotate more slowly or more quickly than previously.

Herein, the controller 13 executes rotation control of the circle menu based on the trajectory of the forefront end of the measuring probe 11. In other words, the rotation control of the circle menu is not influenced by the orientation (downward, lateral, and so on) of the measuring probe 11 itself.

(C-2. Operating Circle Menu by Rotating Probe around Axis)

Figure 11:
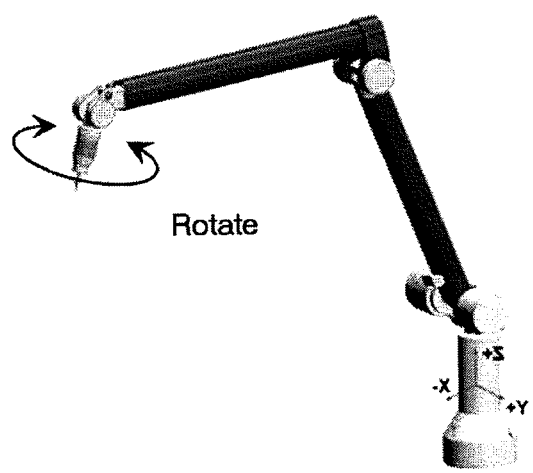
FIG. 11 illustrates an exemplary menu selection operation of the coordinate measuring device according to the first embodiment.

A process of operating the circle menu by rotating the probe around an axis is described with reference to FIG. 11.

While displaying the circle menu, the controller 13 detects rotation of the measuring probe 11 around the axis. The controller 13 is capable of detecting rotation centered on the axis of the measuring probe 11, as shown in FIG. 11. Herein, the controller 13 preferably identifies the rotation direction (rightward or leftward). In addition, the controller 13 preferably detects the rotation speed.

When the controller 13 detects the rotation of the measuring probe 11 around the axis, the controller 13 performs display control, which rotates the circle menu. Herein, the rotation direction of the circle menu preferably changes in response to the rotation direction (rightward or leftward). In addition, the rotation speed of the circle menu preferably changes in response to the rotation speed. In other words, when the measuring probe 11 is rotated more slowly or more quickly than previously, display of the circle menu is controlled so as to rotate more slowly or more quickly than previously.

(C-3. Operating Circle Menu by Swinging Probe Left-right or Up-down)

A process of operating the circle menu by swinging the probe left-right or up-down is described with reference to FIG. 12.

While displaying the circle menu, the controller 13 detects a trajectory of the forefront end of the measuring probe 11. Herein, detection of the trajectory is achieved with a method similar to that of C-1.

Figure 12:
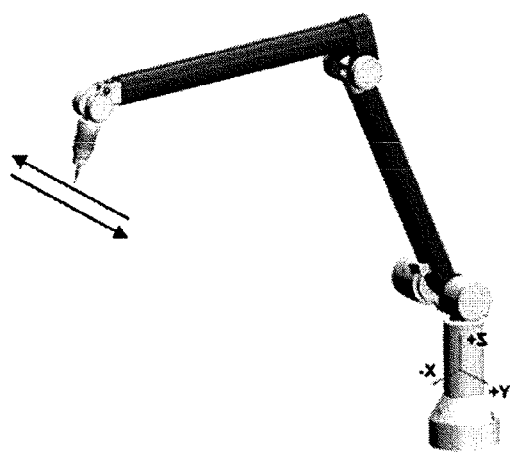
FIG. 12 illustrates an exemplary menu selection operation of the coordinate measuring device according to the first embodiment.

The controller 13 identifies whether the detected trajectory of the measuring probe 11 is a straight-line or arced movement, as shown in FIG. 12. Herein, identification of the trajectory is achieved with a method similar to that of C-1. Moreover, herein, the controller 13 preferably calculates a magnitude of an oscillation or of a displacement distance of the trajectory based on the coordinates included in the trajectory. Further, the controller 13 preferably identifies an orientation of the trajectory based on, e.g., the time series order of the set of coordinates included in the trajectory. In addition, the controller 13 preferably calculates the speed with which the trajectory is traced based on, e.g., an amount of time to obtain the set of coordinates included in the trajectory.

When the trajectory of the measuring probe 11 is a straight line or arced, the controller 13 performs display control, which rotates the circle menu. Herein, the rotation direction of the circle menu preferably changes in response to the direction in which the trajectory is traced. In addition, the rotation speed of the circle menu preferably changes in response to the speed with which the trajectory is traced. In other words, when the measuring probe 11 is swung more slowly or more quickly than previously, display of the circle menu is controlled so as to rotate more slowly or more quickly than previously. Further, when the oscillation or displacement distance of the trajectory is less than the threshold value, the circle menu may be controlled so as to rotate by one or a plurality of commands.

Exemplary effects of the present embodiments are as follows. According to the embodiment disclosed with the A arm menu display, the coordinate measuring device 10 does not display the arm menu during measurement and can use the display 132 to its greatest extent for display of measurement results and the like. In addition, the arm menu can be displayed while holding the measuring arm 12 (more specifically, the measuring probe 11) without the operator needing to approach the controller 13 and use an input device or the like connected to the controller 13.

In addition, according to the embodiment with the A-1 arm menu display using detection of the arm operation boundary (limit), the arm menu can be readily displayed because a limit ON status can only be generated by operation of the forefront end axis of the measuring arm 12 (i.e., the forefront end axis with the retained measuring probe 11). When the limit ON status is generated, a message such as "boundary" is merely displayed on the display 132 and the operator has difficulty identifying that the limit ON status has been generated. However, in the present embodiment, the arm menu is displayed and so such identification is facilitated. Moreover, when the operation boundary (limit) status is cleared within a predetermined amount of time, display of the arm menu ceases, and so even when the limit ON status is mistakenly generated, measurement can continue quickly. In addition, because the predetermined amount of time can be changed as desired, different optimal operability can be achieved for each operator.

In addition, according to the embodiment with the A-2 arm menu display using successive pressing of the selection button of the probe and the embodiment with the A-3 arm menu display using the press-and-hold of the selection button of the probe, the arm menu can be readily displayed simply by operating the selection button of the measuring probe 11. In addition, because a time interval for depression of the selection button or a duration of continuous depression of the selection button can be changed for each operator, different optimal operability can be achieved for each operator.

In addition, according to the embodiment with the A-4 arm menu display using displacement of the probe outside the predefined measuring area, the arm menu can be displayed by a natural gesture of moving the measuring probe 11 away from the work piece, thus improving operability. In such a case, menu operation occurs after moving away from the work piece. Therefore, interference and the like with the work piece are avoided and safety is improved. In addition, the measuring area can be defined by adding the safety zone to the approximate shape of the work piece. However, the size of the safety zone can be changed, and thus different optimal operability can be achieved for each operator.

In addition, according to the embodiment with the B-1 circle menu with the donut-shaped hierarchy, all of the commands can be seen at once with the circle menu, and thus a direction of rotation to reach the command to be selected can be readily determined. In other words, by rotating the circle menu in the direction in which the command to be selected is closest, menu selection can be performed quickly, thus improving operability.

In addition, according to the embodiment with the B-2 drum-shaped circle menu rotating laterally or longitudinally, a small menu can be displayed, and thus an area hiding other information displayed on the display 132 is small. In addition, a sub-menu can be readily displayed at the same time as the top menu, and a selection history can be displayed in an easy-to-understand manner. Moreover, even when the number of commands increases, the size of the menu does not change. This embodiment thus has excellent legibility.

In addition, according to the various embodiments with the C arm menu display enabling selection using only the probe, menu selection can be made by operating only the forefront end axis, and thus operation can be concluded quickly and a physical burden can be alleviated. In addition, even a menu with a complex hierarchy can be accommodated, and operability can be maintained that is comparable to that of a case of direct input to the controller 13 using a pointing device or the like. Moreover, a "back" operation can be performed quickly by operating a cancel button of the measuring probe 11. Furthermore, when employing a circle or straight-line gesture in response to the donut- or drum-shaped circle menu, a relationship between the menu and the trajectory is intuitively understood and excellent operability can be obtained.

The present invention is not limited to the embodiments above and can be modified as needed without departing from the scope of the invention. For example, in the above-noted embodiments, the controller 13 is described as a hardware configuration. However, the present invention is not limited to this, and desired processes can also be achieved by executing a computer program in a CPU (Central Processing Unit). In such a case, the computer program can be stored using various types of non-transitory computer-readable media and can be supplied to a computer. Non-transitory computer-readable media include various types of tangible storage media. Examples of non-transitory computer-readable media include a magnetic storage medium (for example, a flexible disk, a magnetic tape, and a hard disk drive); a magnetooptical storage medium (for example, a magnetooptical disk); a CD-ROM (Read Only Memory); a CD-R; a CD-R/W; and a semiconductor memory (for example, a mask ROM, PROM (Programmable ROM), EPROM (Erasable PROM), flash ROM, and RAM (Random Access Memory)). In addition, the program may be supplied to the computer by various types of transitory computer readable media. Examples of transitory computer readable media include an electric signal, an optical signal, and an electromagnetic wave. Transitory computer readable media can supply the program to the computer via a wired communication channel such as electric wires and optical fibers, or via a wireless communication channel.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:

1. A coordinate measuring device comprising:
   a measuring probe configured to measure three-dimensional coordinates;
   a measuring arm configured to support the measuring probe, and further configured to output position information for calculating the three-dimensional coordinates;
   a controller connected to the measuring arm and configured to detect the three-dimensional coordinates based on the position information; and
   a display configured to display a menu,
   wherein the controller is configured to display the menu on the display when a predefined menu display operation performed using the measuring probe is detected.

2. The coordinate measuring device according to claim 1, wherein the menu display operation is a gesture moving the measuring arm to an operation boundary.

3. The coordinate measuring device according to claim 1, wherein the menu display operation is an act of depressing a button on the measuring probe a plurality of times within a predetermined amount of time.

4. The coordinate measuring device according to claim 1, wherein the menu display operation is an act of continuously depressing a button on the measuring probe for a predetermined amount of time or longer.

5. The coordinate measuring device according to claim 1, wherein the menu display operation is a gesture displacing the measuring probe outside a predefined measuring area.

6. The coordinate measuring device according to claim 5, wherein the controller is configured to calculate the measuring area based on an approximate shape of a work piece.

7. The coordinate measuring device according to claim 1, wherein the menu is a circular menu configured to link at least one command display area in an annular shape.

8. The coordinate measuring device according to claim 1, wherein the menu is a circular menu configured to link at least one command display area in a band shape.

9. The coordinate measuring device according to claim 7, wherein, when a predefined provisional command selection operation performed using the measuring probe is detected, the controller designates each of the command display regions included in the circular menu as a successive provisional selection.

10. The coordinate measuring device according to claim 7, wherein:
the circular menu includes at least one command which includes at least one sub-command in a subordinate tier, and
when the command that includes the sub-command in the subordinate tier is selected by a predefined command selection operation performed using the measuring probe, the controller displays on the display a sub-menu that includes a display region for the sub-command related to the selected command, the sub-menu being displayed in a manner similar to that of the circular menu.

11. The coordinate measuring device according to claim 9, wherein, when a gesture of the measuring probe tracing a circular trajectory is detected, the controller recognizes the gesture as the provisional command selection operation.

12. The coordinate measuring device according to claim 9, wherein, when a gesture of the measuring probe rotating centered on an axis is detected, the controller recognizes the gesture as the provisional command selection operation.

13. The coordinate measuring device according to claim 9, wherein, when a gesture of the measuring probe tracing one of a straight-line and an arced trajectory is detected, the controller recognizes the gesture as the provisional command selection operation.

14. The coordinate measuring device according to claim 11, wherein, while in a state of sequentially provisionally selecting each of the command display areas, the controller changes one of a direction and a speed in accordance with one of a direction and a speed, respectively, of the detected gesture.

15. A method of controlling a coordinate measuring device, the method comprising:
detecting the execution of a predefined menu display operation by a measuring probe; and
displaying, on a display, a menu in response to detection of the menu display operation.

16. At least one non-transitory computer readable medium storing a program for executing the method according to claim 15 on a computer.

* * * * *